(12) United States Patent
Topf et al.

(10) Patent No.: US 10,183,309 B1
(45) Date of Patent: Jan. 22, 2019

(54) METHOD AND APPARATUS FOR IMPREGNATING A CONTINUOUS FIBER REINFORCEMENT

(71) Applicant: The Boeing Company, Chicago, IL (US)

(72) Inventors: Richard Philip Topf, Orange, CA (US); Kaia Elena David, La Habra Heights, CA (US); Mary Margaret Litwinski, Dana Point, CA (US); Steffan Walker Brown, Long Beach, CA (US); Leanne L. Lehman, Aliso Viejo, CA (US)

(73) Assignee: The Boeing Company, Chicago, IL (US)

( * ) Notice: Subject to any disclaimer, the term of this patent is extended or adjusted under 35 U.S.C. 154(b) by 449 days.

(21) Appl. No.: 14/676,235

(22) Filed: Apr. 1, 2015

(51) Int. Cl.
*B05C 3/12* (2006.01)
*B05C 3/132* (2006.01)
*B05C 11/10* (2006.01)
*B05D 1/18* (2006.01)

(52) U.S. Cl.
CPC .............. *B05C 3/125* (2013.01); *B05C 3/132* (2013.01); *B05C 11/10* (2013.01); *B05D 1/18* (2013.01)

(58) Field of Classification Search
None
See application file for complete search history.

(56) References Cited

U.S. PATENT DOCUMENTS

| 1,595,474 | A | * | 8/1926 | Minton | D21F 5/00 |
| | | | | | 118/419 |
| 2,473,599 | A | * | 6/1949 | Liebel | B05C 3/125 |
| | | | | | 226/179 |
| 3,130,076 | A | * | 4/1964 | Gruber | D06M 14/04 |
| | | | | | 118/429 |
| 3,460,978 | A | * | 8/1969 | McGovney | D06B 3/04 |
| | | | | | 118/419 |
| 5,174,822 | A | * | 12/1992 | Nabhan | B05C 3/125 |
| | | | | | 118/33 |
| 5,250,243 | A | | 10/1993 | Allaire et al. | |
| 5,817,223 | A | * | 10/1998 | Maloney | C25D 13/16 |
| | | | | | 204/471 |
| 5,936,861 | A | * | 8/1999 | Jang | B29C 70/384 |
| | | | | | 700/98 |
| 7,153,379 | B2 | | 12/2006 | Millard et al. | |

(Continued)

OTHER PUBLICATIONS

Guglielmi et al., "Production of Oxide Ceramic Matrix Composites by a Prepreg Technique," Materials Science Forum, Advanced Powder Technology VIII, vols. 727-728, Chapter 2: Ceramics I, Aug. 2012, pp. 556-561.

(Continued)

*Primary Examiner* — Jethro M. Pence
(74) *Attorney, Agent, or Firm* — Yee & Associates, P.C.

(57) ABSTRACT

A continuous ceramic matrix composite strip is produced by passing a dry ceramic fiber strip through a ceramic slurry bath. Impregnation wheels within the bath guide the fiber strip through the bath and force the ceramic slurry into the fiber strip, thereby impregnating the strip. The impregnation wheels stir the ceramic slurry to maintain a homogeneous mixture. Air knives remove excess slurry from the strip. Thickness and width controls squeeze the impregnated strip to desired thickness and width dimensions.

29 Claims, 14 Drawing Sheets

(56) References Cited

U.S. PATENT DOCUMENTS

| | | | | |
|---|---|---|---|---|
| 7,857,111 B1* | 12/2010 | Moore | ............... | F16D 65/125 |
| | | | | 188/218 XL |
| 2003/0200064 A1* | 10/2003 | Bay | ............... | G05B 15/02 |
| | | | | 703/2 |
| 2013/0149425 A1* | 6/2013 | Caridis | ............... | A47J 37/1276 |
| | | | | 426/438 |

OTHER PUBLICATIONS

Kopeliovich, "Fabrication of Ceramic Matrix Composites by Slurry Infiltration," SubsTech.com, last modified Jun. 2012, 2 pages, accessed Aug. 20, 2014. http://www.substech.com/dokuwiki/doku.php?id=fabrication_of_ceramic_matrix_composites_by_slurry_infiltration.

Luthra et al., "Emerging Applications and Challenges in using Ceramics at General Electric," Ceramic Leadership Summit, Aug. 2011, 24 pages.

Downey et al., "Frontiers," The Boeing Company, vol. XIII, Issue V, Sep. 2014, 46 pages.

Zhu et al., "Manufacturing 2D carbon-fiber-reinforced SiC matrix composites by slurry infiltration and PIP process," Ceramics International, vol. 34, Jul. 2008, pp. 1201-1205.

* cited by examiner

METHOD AND APPARATUS FOR IMPREGNATING A CONTINUOUS FIBER REINFORCEMENT

BACKGROUND INFORMATION

1. Field

The present disclosure generally relates to composite materials, and deals more particularly with a method and apparatus for impregnating a continuous fiber reinforcement with a matrix material.

2. Background

Composite structures may be fabricated using composite build materials such as strips of preimpregnated fiber reinforcement (prepreg) that are applied over a supporting tool by automated fiber placement (AFP) machines. The prepreg used in automated fiber placement comprise a resin such as an epoxy that is reinforced with fiber such as carbon fibers. In some applications, however, where the structure is subjected to high temperatures, it may be necessary to use composite build materials such as ceramic matrix composites (CMCs). In addition to their ability to withstand high temperatures without degradation, CMCs are desirable for certain applications because of their light weight and resistance to corrosion.

CMCs typically comprise a ceramic matrix material such as a glass, a glass-ceramic or a crystalline ceramic in which refractory inorganic fibers are held. In one known process, CMCs are produced by preparing a liquid suspension of the ceramic matrix material in powdered form, and then immersing the inorganic fibers in the suspension. The suspension comprises a solvent such as water or an organic liquid as the carrier for the ceramic powders. In one variant of this process, known as slurry infiltration, the reinforcing fibers are passed through a ceramic slurry which penetrates the porous structure formed by the fibers. The driving force of the infiltration is largely capillary effect, but may be enhanced by vacuum or pressure. After the fibers have been infiltrated with the suspension, solvent is removed by evaporation. The materials discussed above are challenging to process and difficult to convert into build materials that are well-suited for high-volume production using techniques such as automated layup of prepreg.

Accordingly, there is a need for a method and apparatus for fabricating CMC build materials such as CMC prepregs. There is also a need for a method and apparatus as described above which are capable of producing continuous strips of CMC prepreg that may be used by AFP machines to automate the layup of CMC structures.

SUMMARY

The disclosed embodiments provide an automated method and apparatus for producing CMC build materials in the form of continuous strips of prepreg that may be used in AFP machines for automated layup of composite structures. Large quantities of CMC prepreg strips may be manufactured relatively quickly and economically. The disclosed embodiments allow production of CMC prepreg strips of various thicknesses and widths that are suitable for fiber placement processing. The apparatus comprises a supply reel containing a continuous strip of dry fibers such as tows, and a matrix fluid bath into which the strip of dry fibers is immersed. The continuous strip of dry fibers travels in a serpentine path around an array of impregnation wheels within the bath which force the matrix fluid into the fibers, thereby wetting out the fibers and impregnating the fiber strip. The impregnation wheels include paddle-like protrusions that provide constant mixing of the matrix fluid to maintain a homogeneous mixture in the bath, thus eliminating the need for a separate mixing mechanism. The impregnated strip then passes through air knives which remove excess matrix fluid from the strip, following which the strip passes through rollers that adjust the width and thickness of the strip. The impregnated strip is dried using infrared heat energy, and is then spooled onto an AFP-compatible take-up reel to facilitate automated fiber placement.

According to one disclosed embodiment, apparatus is provided for impregnating a continuous fiber strip with a matrix material. The apparatus comprises a continuous fiber strip supply reel configured to hold a length of the fiber strip, and a matrix fluid bath configured to contain a matrix fluid. The apparatus also includes a plurality of rotatable wheels immersed in the bath for guiding the continuous fiber strip through the bath and forcing the matrix fluid into the continuous fiber strip to thereby impregnate the continuous fiber strip with the matrix fluid. The apparatus further includes a take-up reel for taking up the continuous fiber strip after the continuous fiber strip has been impregnated with the matrix fluid. The wheels are arranged in a staggered pattern forming a serpentine path of travel of the continuous fiber strip through the bath. Each of the wheels includes through holes therein allowing the matrix fluid to pass therethrough, and at least certain of the wheels includes at least one paddle-like protrusion for mixing the matrix fluid as the wheel rotates. The apparatus also includes a pair of air knives for stripping away excess matrix fluid from the continuous fiber strip. The air knives include nozzle openings respectively located on opposite sides of the fiber strip, and the nozzle openings are configured to jet curtains of pressurized, laminar air flow onto the continuous fiber strip. The apparatus may also comprise a width control for controlling the width of the impregnated fiber strip after it has been impregnated with the matrix fluid, a thickness control for controlling the thickness of the continuous fiber strip after the fiber strip has been impregnated with the matrix fluid, and a dryer for drying the continuous fiber strip after the continuous fiber strip has been impregnated with the matrix fluid. In one variation, the apparatus may include one or more reels adapted to contain a backer tape for adding one or more one backer tapes to the continuous fiber strip.

According to another disclosed embodiment, apparatus is provided for producing a ceramic prepreg strip, comprising a supply reel configured to hold a strip of dry ceramic fibers, and a ceramic slurry bath configured to contain a slurry of a ceramic matrix fluid. The apparatus also includes a plurality of impregnation wheels for guiding the strip of dry ceramic fibers through the bath and forcing the ceramic matrix fluid into the strip of dry ceramic fibers to thereby impregnate the strip of dry ceramic fibers with the ceramic matrix fluid. A thickness control is provided for controlling the thickness of the strip of dry ceramic fibers after the strip of dry ceramic fibers has been impregnated with the ceramic matrix fluid. The apparatus further includes a take-up reel for taking up the strip of dry ceramic fibers after the strip of dry ceramic fibers has been impregnated with the ceramic matrix fluid. A dryer is provided which includes a heater for drying the ceramic matrix fluid in the fiber strip, along with a temperature sensor for sensing the temperature of the fiber strip, and a controller for adjusting the heater based on the temperature of the fiber strip sensed by the temperature sensor. The heater may include infrared lamps, and the sensor may be located between the dryer and the take-up reel. The apparatus further comprises at least one air knife for stripping away excess ceramic matrix on the fiber strip after the fiber strip has been impregnated, and a width control for controlling the width of the fiber strip after the fiber strip has been impregnated. The air knife and the width control are substantially vertically aligned with each other above the ceramic slurry bath. The impregnation wheels are arranged in a staggered pattern defining a serpentine path of travel of the fiber strip through the ceramic slurry bath. The apparatus may further comprise at least one pivoting swing arm. The impregnation wheels are mounted on the swing arm for pivoting movement between an operative position immersed within the ceramic slurry bath, and a standby position raised above the ceramic slurry bath.

According to still another embodiment, apparatus is provided for impregnating a continuous fiber strip with a matrix material. A supply reel is configured to hold a length of the continuous fiber strip, and a matrix fluid bath is configured to contain a matrix fluid. At least one wheel is provided within the matrix fluid bath for forcing the matrix fluid into the continuous fiber strip. A device is provided for stripping excess matrix fluid from the continuous fiber strip. A take-up reel is provided for taking up the continuous fiber strip after the continuous fiber strip has been stripped of excess matrix fluid. The device for stripping the continuous fiber strip includes air knives for jetting curtains of laminar air flow onto the continuous fiber strip, and includes air nozzle openings located on opposite sides of the continuous fiber strip.

According to another embodiment, a method is provided of impregnating a continuous ceramic fiber strip with a ceramic matrix material. The method includes immersing a plurality of impregnation wheels in a bath of a ceramic slurry, drawing the continuous ceramic fiber strip through the bath and around each of the impregnation wheels, and forcing the ceramic slurry into the continuous ceramic fiber strip as the ceramic fiber strip is drawn around each of the impregnation wheels. Forcing the ceramic slurry into the continuous ceramic fiber strip is performed by tensioning the continuous ceramic fiber strip against each of the impregnation wheels. The method may further comprise stripping excess matrix fluid away from the continuous fiber strip after the continuous fiber strip is drawn through the bath, including jetting curtains of air onto the continuous fiber strip. The method may also include controlling the width of the continuous fiber strip by drawing the fiber strip between a pair of rollers, and controlling the thickness of the continuous fiber strip by drawing the continuous fiber strip between a pair of rollers suitably spaced to produce a desired thickness.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and advantages thereof, will best be understood by reference to the following detailed description of an illustrative embodiment of the present disclosure when read in conjunction with the accompanying drawings, wherein:

DETAILED DESCRIPTION

Figure 1:
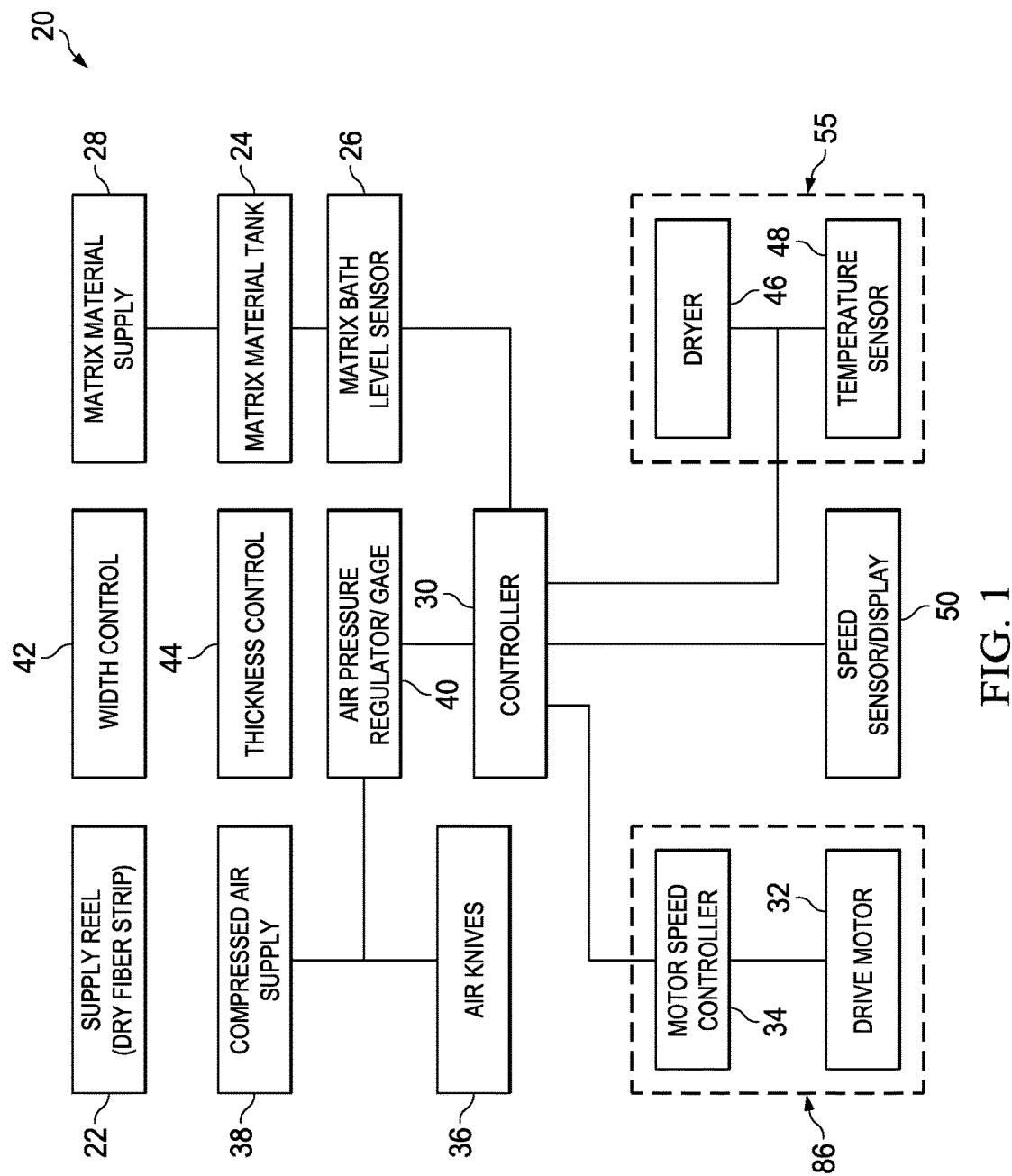
FIG. 1 is an illustration of an overall block diagram of apparatus for impregnating a continuous fiber reinforcement with a matrix material.
Figure 2:
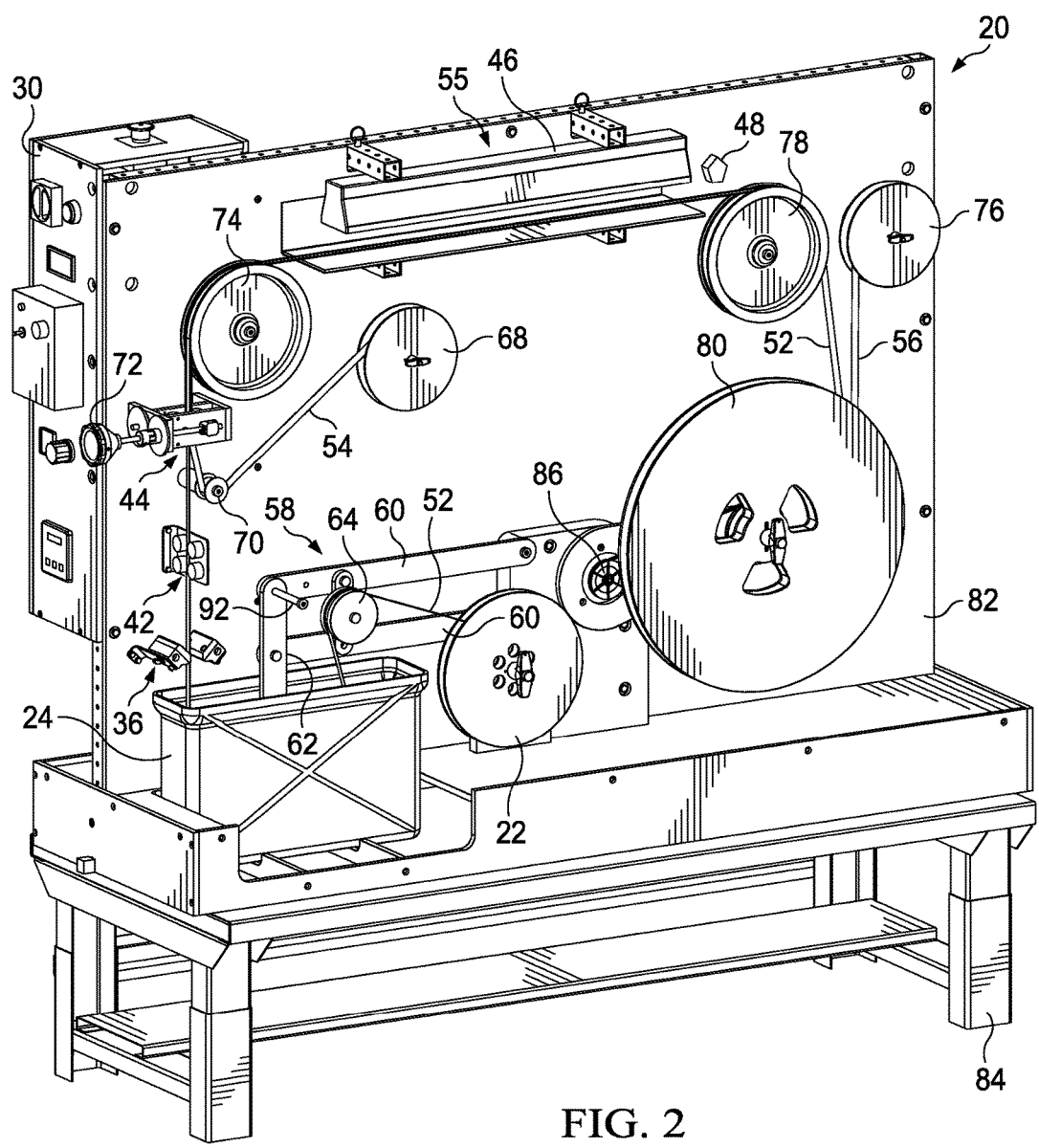
FIG. 2 is an illustration of a perspective view of the front of the apparatus shown in FIG. 1.

The disclosed embodiments relate to an apparatus suitable for producing strips of composite build material that may be employed in AFP (automated fiber placement) machines for automated layup of composite structures. In the exemplary embodiment, the strips comprise ceramic fibers that are impregnated with a ceramic matrix, however as will be explained below in more detail, the disclosed apparatus and related method may be employed to produce other types of composite build materials in strip form, such as organic prepreg, where it is necessary to impregnate a fiber reinforcement with a slurry or similar suspension of a flowable materials.

Referring to FIGS. 1-4, the apparatus 20 comprises an upstanding mounting plate 82 on which a series of functional components are mounted, including a controller 30 which may comprise a PC (personal computer) or a PLC (programmable logic controller). The mounting plate 82 is supported on a suitable machine base 84. Optionally, a protective enclosure 88 (FIG. 4) covers the components on the front side of the mountain plate 82 to prevent inadvertent contact of the components by operating personnel.

A fiber strip supply reel 22 is rotatably mounted on the front side of the mounting plate 82, and holds a length of a continuous dry fiber strip 52 that is to be impregnated with a desired matrix material. As used herein, the terms "fiber strip", "strip", "ceramic strip", "fiber reinforcement", "continuous fiber strip" and "reinforcement strip" all refer to a continuous strip or ribbon of an impregnable fiber reinforcement material that include fibers. The fiber reinforcement material may be arranged in any of a variety of configurations, including unidirectional and bidirectional fibers, as well as dry fibers that are woven, knitted or braided. The fiber strip 52 may be in the form of tape, or split tape sometimes referred to as tows.

The fiber reinforcement material will depend upon the application, and in the case of applications using CMCs, the fiber reinforcement material may comprise organic fibers such as carbon fibers, or inorganic fibers including metal fibers and nonmetallic inorganic fibers such as ceramic fibers, glass and mineral fibers and single crystal fibers. The matrix material used in CMCs employing these fibers may include ceramic, ceramic-glass and glass matrices such as, without limitation, alumina, silica, glass, mullite, silicon carbide and silicon nitride to name only a few.

The continuous fiber strip 52 is drawn from the fiber strip supply reel 22 onto a wheel 64 that redirects the fiber strip 52 into a tank 24 containing a bath 85 (FIG. 6) of a matrix fluid which is used to infiltrate and thereby impregnate the dry fiber strip 52. The tank is removably mounted on the apparatus 20. In one embodiment, the bath 85 may comprise a slurry including a matrix material, such as a ceramic slurry, and the fiber strip 52 may comprise ceramic fibers. The fiber strip 52 is drawn through the bath 85 in the tank 24 in a serpentine path around a plurality of rotatable wheels 66 mounted on one or more pivoting swing arms 60 discussed later in connection with FIGS. 6-10.

After being impregnated with the matrix fluid within the bath 85, the impregnated fiber strip 52 is drawn vertically, in succession, from the tank 24 through a pair of air knives 36, a width control 42 and a thickness control 44. The air knives 36, the width control 42 and the thickness control 44 are substantially vertically aligned with each other, above the tank 24. When the impregnated fiber strip 52 initially exits from the tank 24, the fiber strip 52 may contain an excess amount of matrix fluid and may have a width and/or thickness that is greater than a desired nominal width and thickness.

The air knives 36, discussed below in more detail in connection with FIGS. 11-13, jet thin curtains of pressurized, laminar air flow respectively onto opposite sides of the impregnated fiber strip 52, causing excess matrix fluid to be wiped or stripped away from the strip 52. The excess matrix fluid stripped away by the air knives 36 falls by gravity into the tank 24 immediately below. The wetted, impregnated fiber strip 52 then passes through a width control 42 which reduces the width of the impregnated fiber strip 52 to a desired, nominal width. Next, the fiber strip 52 is drawn through the thickness control 44 which includes an adjustment knob 72 for adjusting the thickness of the fiber strip 52 to a desired nominal thickness.

A strip of backer tape 54, which may comprise a polymer film, is drawn from a backer supply reel 68 and trained around a feed wheel 70 which directs the backer tape 54 onto the impregnated fiber strip 52 as the impregnated fiber strip 52 enters the thickness control 44. The backer tape 54 may have a width that is slightly greater than the width of the fiber strip 52, and functions to prevent the still-wet matrix fluid in the fiber strip 52 from being accumulated on or adhering to a redirect wheel 74 and other downstream components of the apparatus 20. For example, and without limitation, in one embodiment where the fiber strip 52 has a width of approximately ½ inch, the backer tape 54 may have a width of approximately 1 inch. The backer tape 54 is also useful in providing the fiber strip 52 with support as the latter travels through downstream processing components of the apparatus 20.

With the width and thickness of the fiber strip having been adjusted to desired values, the fiber strip 52 is then drawn around the redirect wheel 74 into a drying station 55 comprising an elongate dryer box 46. The fiber strip 52 is supported between redirect wheel 74 and another redirect wheel 78 as the fiber strip 52 passes through the dryer box 46. The dryer box 46 may include a heater such as electrically powered infrared lamps (not shown), that is operative to dry the matrix fluid that has been impregnated into the fiber strip 52. The energy supplied by the infrared lamps reduces the volatile components of the matrix fluid through evaporation. The amount of evaporation of the matrix fluid may be controlled by altering the speed at which the fiber strip 52 passes through the dryer box 46, as well as the amount of energy that is supplied by the infrared lamps. The redirect wheels 74, 78 maintain the fiber strip 52 at a desired, constant distance from the infrared lamps. A contact or non-contact temperature sensor 48 may be used to sense the temperature of the fiber strip 52, or the air temperature in close proximity to the fiber strip 52, as the fiber strip 52 exits the drying station 55, and may form part of a feedback loop with the controller 30 used to control the amount of evaporation that takes place. The air temperature in close proximity to the fiber strip 52, for example, within 0.10 inch of the fiber strip 52, is directly related to the degree of dryness of the matrix in the fiber strip 52. The desired degree of dryness will depend on the particular application, and the matrix material.

After being dried, the fiber strip 52 is redirected by a wheel 78 onto a take-up reel 80. Optionally, a second strip of a backer tape 56, which may comprise the polymer film, may be drawn from a backer supply reel 76 and directed onto the fiber strip 52 as it is being spooled onto the take-up reel 80, resulting in the fiber strip 52 being sandwiched between the two strips of backer tapes 54, 56. Optionally, the end of the fiber strip 52 spooled onto on the take-up reel 80 may be sealed with a plastic strip (not shown) to prevent evaporation of the matrix material.

Figure 3:
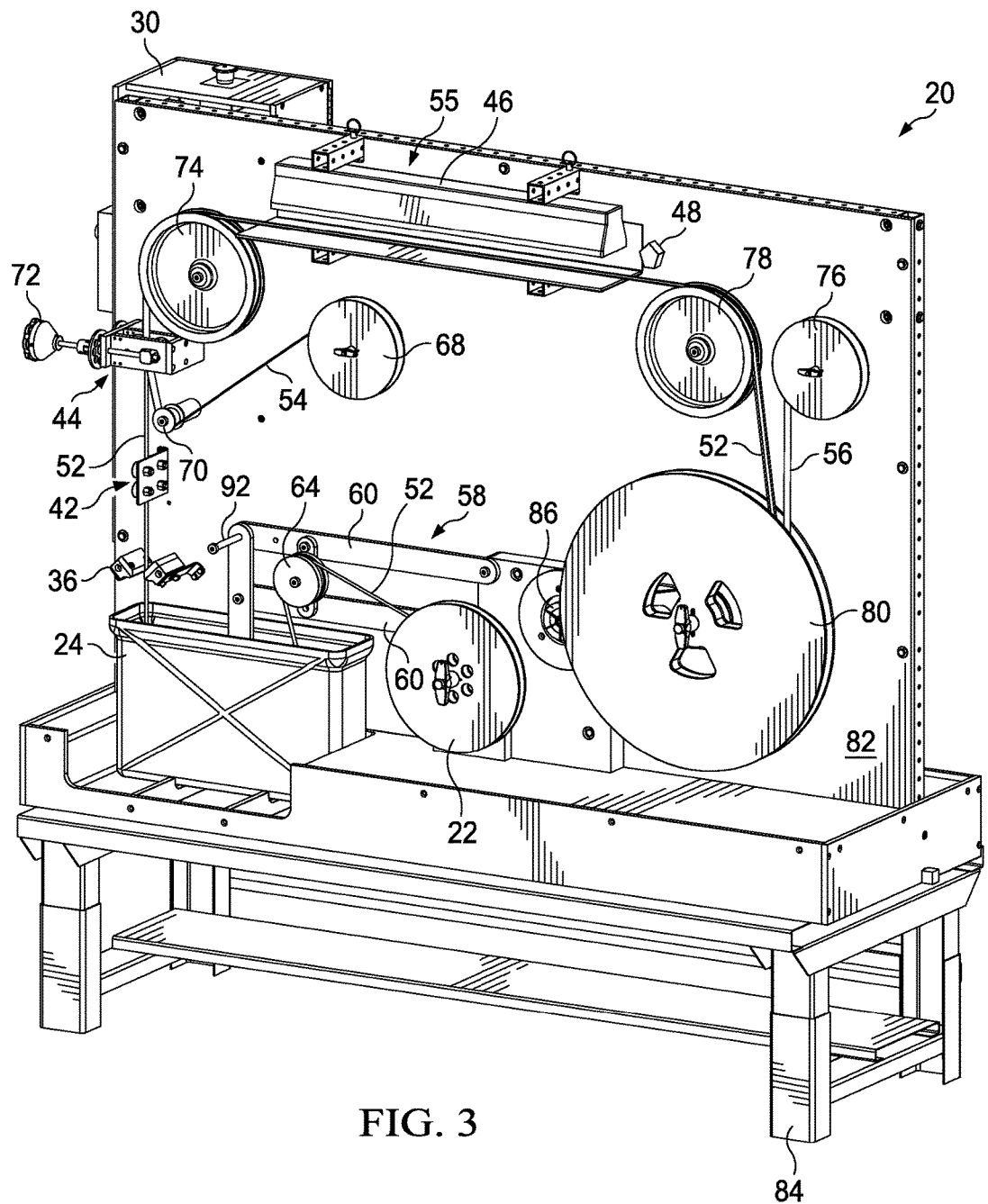
FIG. 3 is an illustration similar to FIG. 2 but taken from a different perspective at the front of the apparatus.
Figure 4:
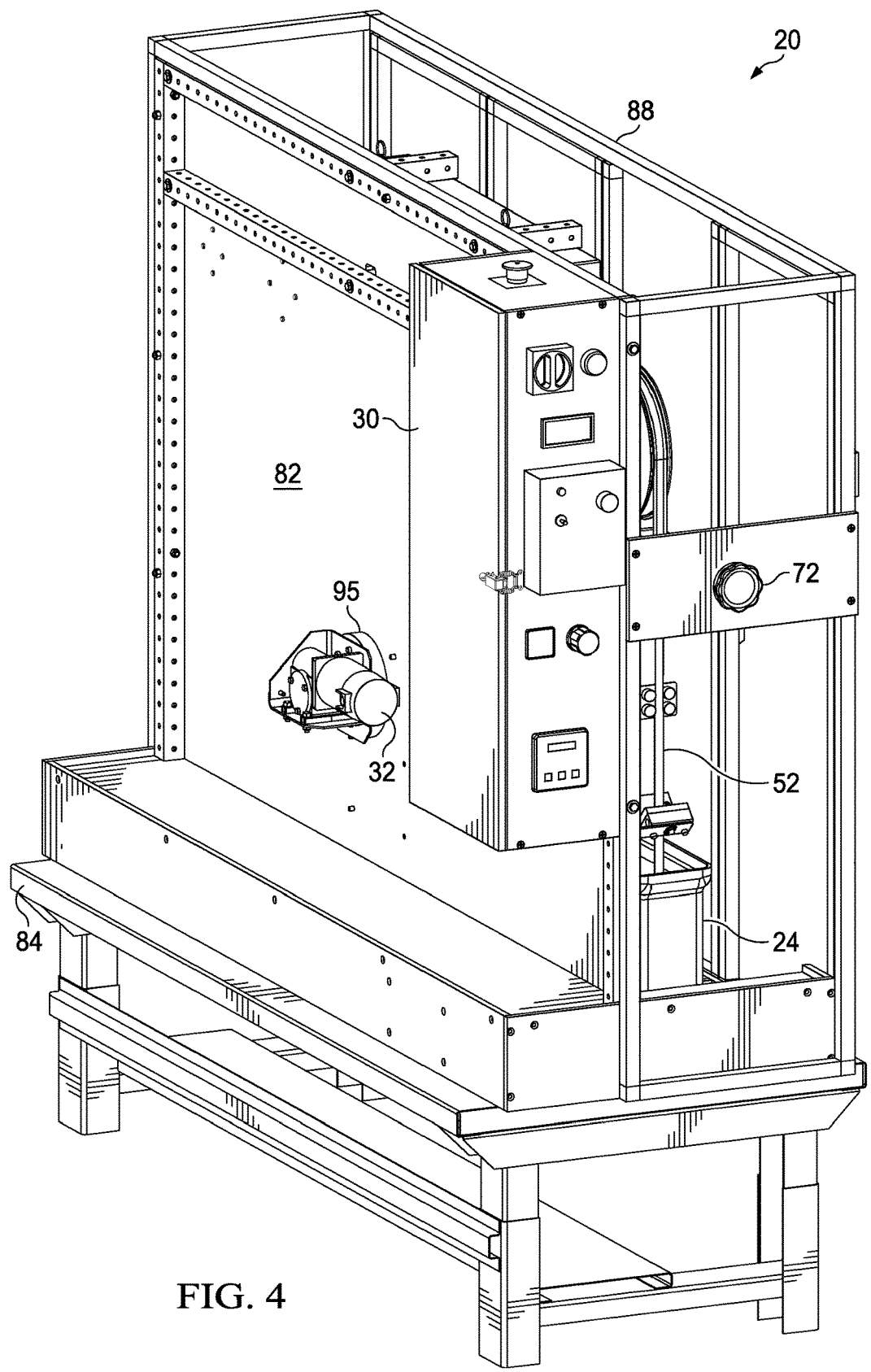
FIG. 4 is an illustration of a perspective view of the rear of the apparatus shown in FIGS. 1-3.
Figure 5:
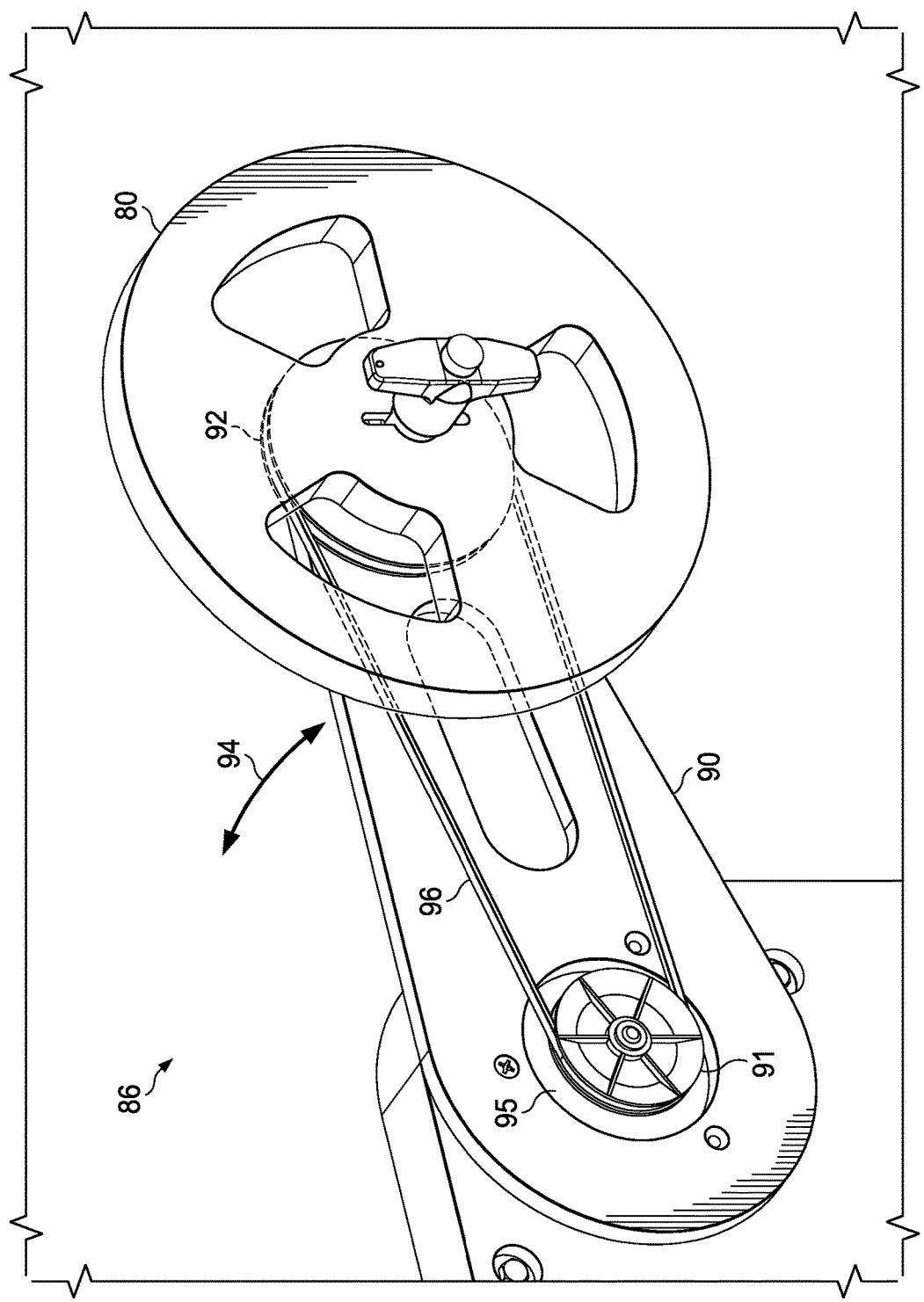
FIG. 5 is an illustration or of a perspective view of a drive and tensioning assembly forming part of the apparatus, a driven take-up reel shown in the phantom.

Referring now to FIGS. 3, 4 and 5, the fiber strip 52 is drawn through the various components discussed above by a drive and tensioning assembly 86 which drives rotation of the take-up reel 80, and maintains a desired amount of tension in the fiber strip 52. The drive and tensioning assembly 86 includes a variable speed electric drive motor 32 mounted on the rear of the mounting plate 82 (see FIG. 4), a clutch 95, a spring-loaded pivotal swing arm 90, a pair of hubs 91, 92 and a drive belt 96. Hub 91 is coupled through the clutch 95 to the drive motor 32, at one end of the swing arm 90, while hub 92 is attached to the take-up reel 80 at the other end of the swing arm 90. The drive motor 32 may include a motor speed controller 34 (FIG. 1) that is operated by the controller 30.

The drive motor 32 drives rotation of the take-up reel 80 through the hubs 91, 92 and the drive belt 96. The take-up reel 80 may pivot 94 along with the swing arm 90, as required, to adjust for changes in tension in the fiber strip 52 and the clutch 95 in order to prevent excess tension from damaging or breaking the fiber strip 52. Although not shown in the drawings, a drag brake may be coupled with the fiber supply reel 22 or other components of the apparatus 20 to maintain proper tension of the fiber strip 52 as it passes through each of the processing stations.

Referring to FIG. 1, one or more air pressure regulators and/or gauges 40 may be coupled with the controller 30 and the compressed air supply 38 to allow the controller 30 adjust the air pressure supplied to the air knives 36. In some embodiments, the matrix fluid bath may be replenished automatically, as needed from a supply of the matrix fluid operated by the controller 30 based on information provided by a matrix bath level sensor 26. The dryer box 46 is controlled by the controller 30 based on the air temperature near the fiber strip 52 sensed by the temperature sensor 48 located slightly downstream of the dryer box 46, as well as a speed sensor 15 which senses the speed at which the fiber strip 52 is passing through the dryer box 46. Adjustment of the dryer box temperature and/or the travel speed of the fiber strip 52 is controlled by the controller 30 to achieve a desired degree of dryness of the fiber strip 52 before it is spooled onto the take-up reel 80.

Figure 6:
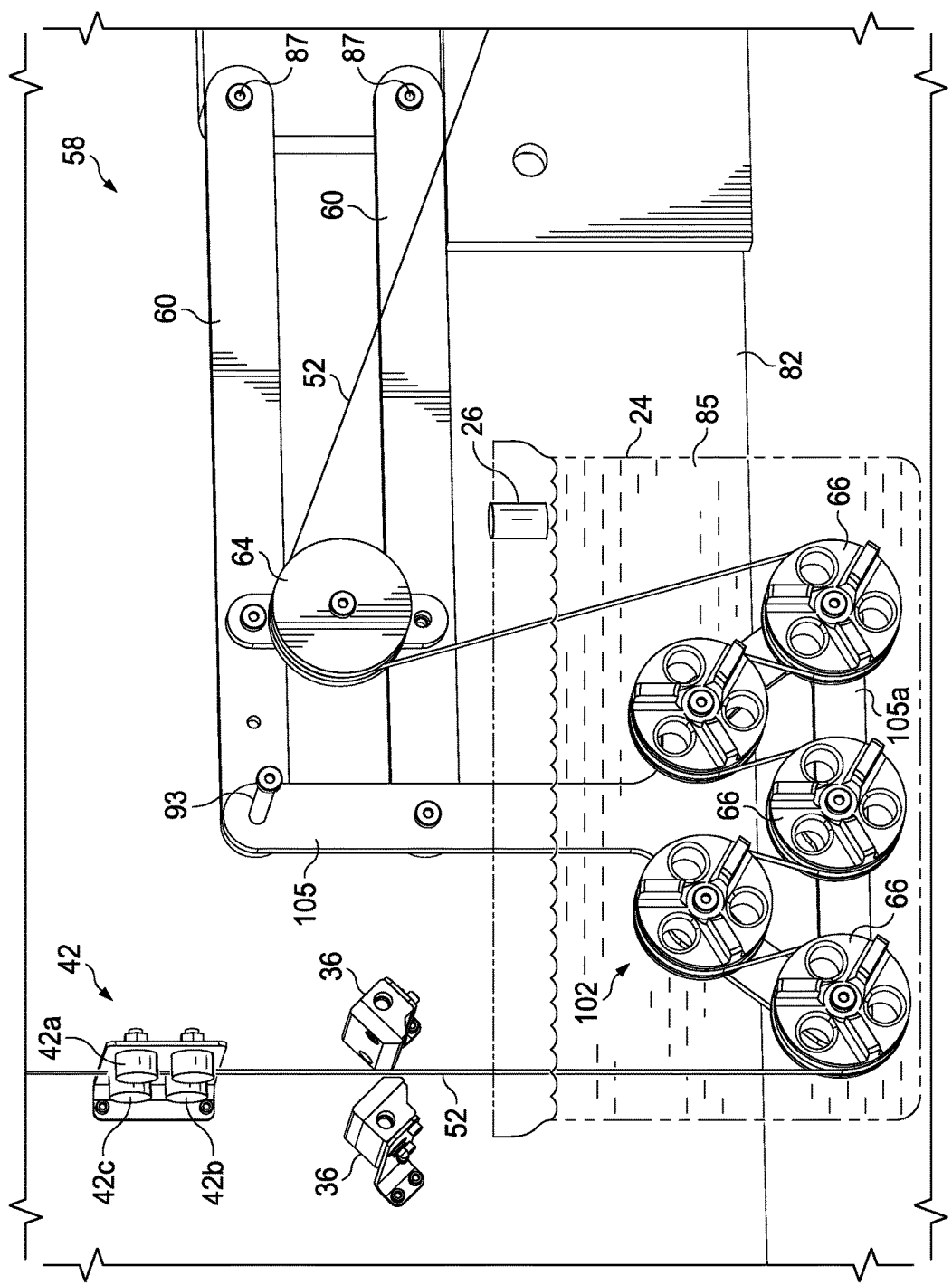
FIG. 6 is an illustration of a perspective view of the dipper assembly, air knives and width control forming part of the apparatus shown in FIGS. 1-5.
Figure 7:
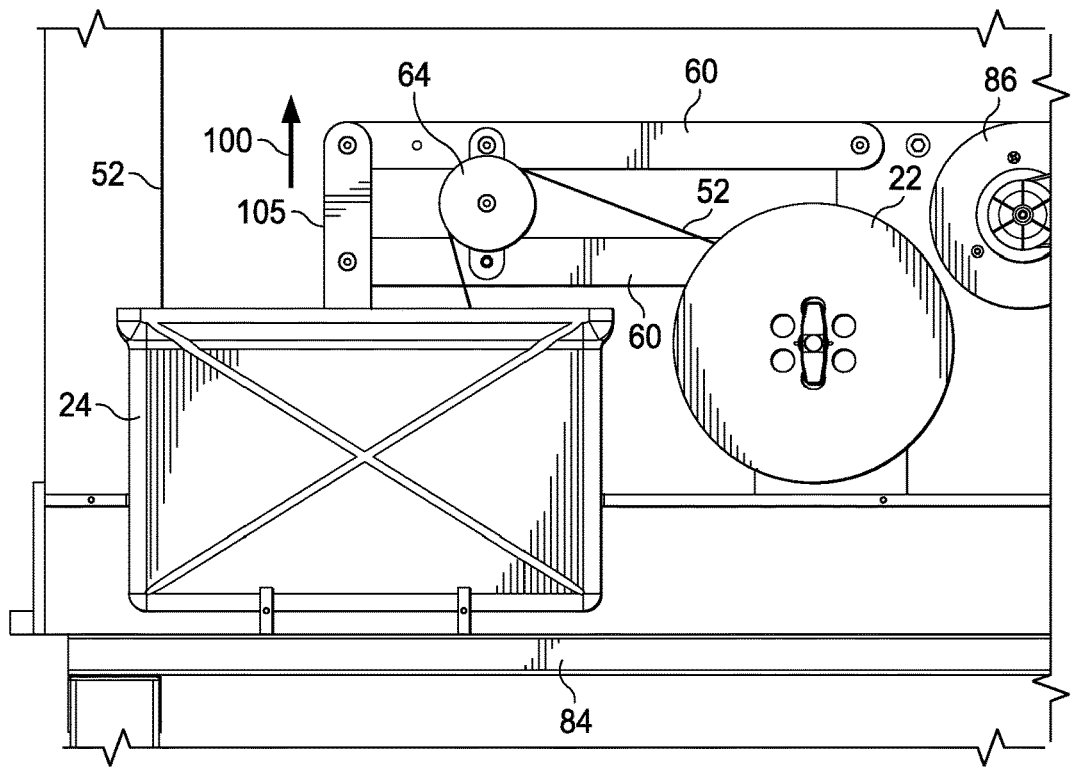
FIG. 7 is an illustration of a front elevational view of a matrix fluid tank, with the dipper assembly shown in its down, operative position positioning the impregnation wheels inside the tank.
Figure 8:
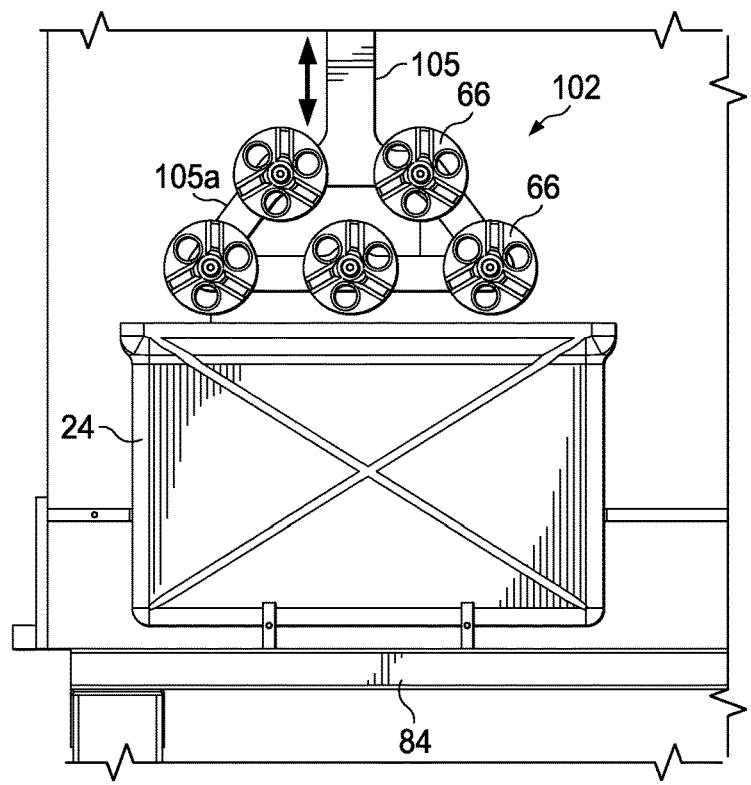
FIG. 8 is an illustration similar to FIG. 7, but showing the dipper assembly in its raised position providing access to the impregnation wheels.

Referring now to FIGS. 6, 7 and 8, the retractable dipper assembly 58 comprises a mounting frame 105 mounted for pivoting movement on the outer ends of a pair of parallel swing arms 60. The inner ends of the swing arms 60 are pivotally mounted at 87 to the mounting plate 82. The previously discussed redirect wheel 64 is mounted on the swing arms 60. The mounting frame 105 includes a lower, generally triangular frame section 105a having an array of 5 impregnation wheels 66 rotatably mounted thereon and arranged in a staggered pattern. In other embodiments, more or less than 5 impregnation wheels 66 may be employed.

The impregnation wheels 66 are arranged in a staggered pattern, and the fiber strip 52 is wrapped around and tensioned against the wheels 66 so as to move through the bath 85 in a serpentine path of travel, causing opposite faces of the fiber strip 52 to alternately be forced into contact with the wheels 66. In other words, after one face of the fiber strip 52 contacts one of the wheels 66, the opposite face then contacts the next-in-line wheel 66 as the strip 52 travels in a serpentine path through the array of wheels 66. As the fiber strip 52 comes into contact with the wheels 66, the matrix fluid is forced into the fiber strip 52. In effect, the wheels 66 squeeze or press the matrix fluid into the fibers of the strip 52. Penetration of the matrix fluid into the fiber strip 52 is aided by the changing rotational directions of the wheels 66, and the tension that is maintained in the fiber strip. The staggered arrangement of the wheels 66 results in the fiber strip 52 wrapping around and coming into contact with more than 180 decrease of each of the wheels 66, thereby assuring that the matrix material is adequately worked into the fiber strip 52. The size of the wheels 66, i.e. the wheel diameter will depend upon the application, and particularly, the minimum bend radius of the fibers in the fiber strip 52. The wheel diameter should be sufficiently large to avoid damaging or breaking the fibers as they are bent around the wheels 66. A handle 93 attached to the outer end of one of the swing arms 60 allows the retractable dipper assembly 58 to be manually raised, lifting the wheels 66 from their operative position inside the tank 24 (FIG. 7), to a loading or standby position (FIG. 8) allowing the fiber strip 52 to initially threaded around the wheels 66.

Figure 9:
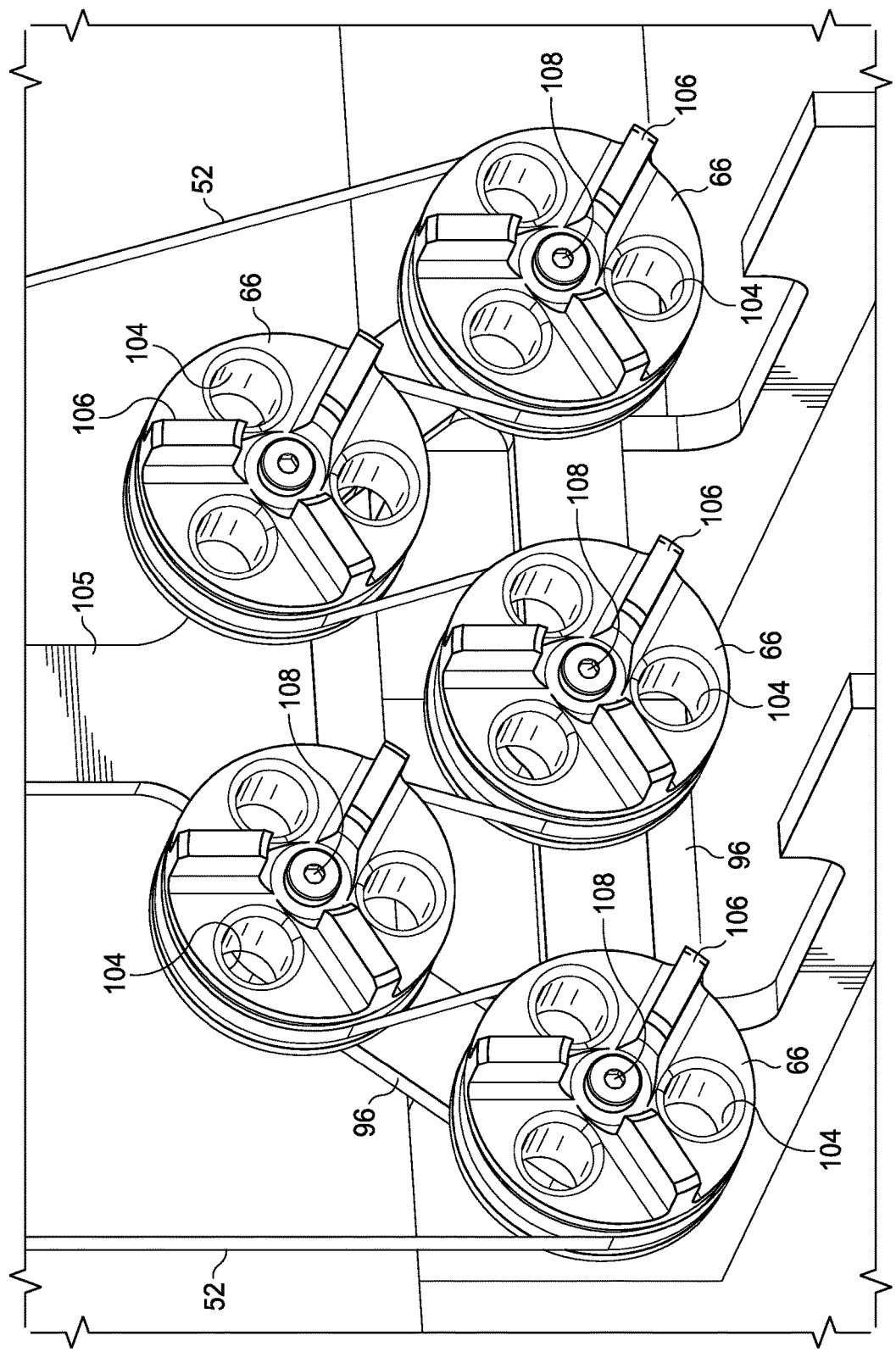
FIG. 9 is an illustration of a perspective view of the impregnation wheels.
Figure 10:
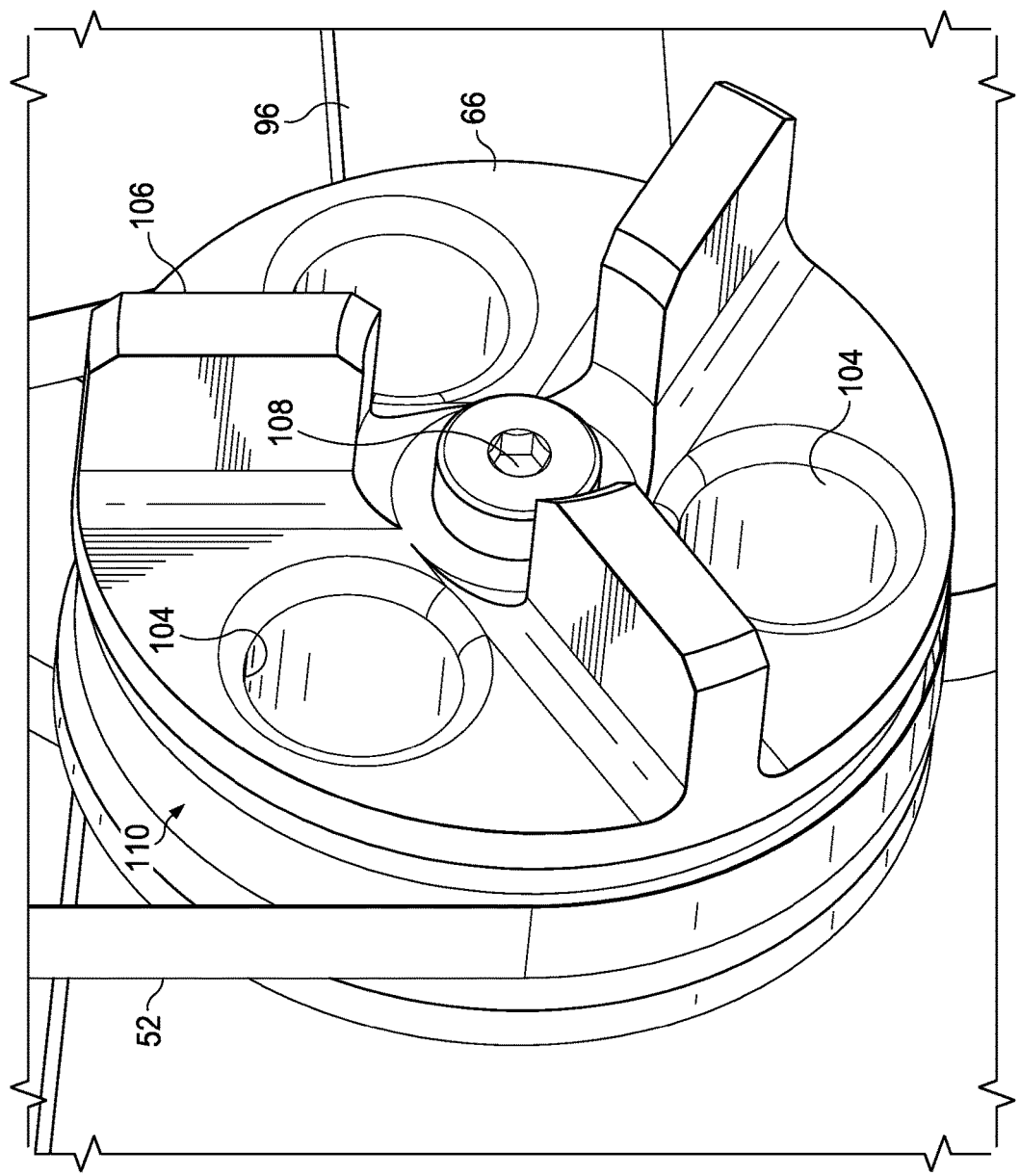
FIG. 10 is an illustration of an enlarged, perspective view of one of the impregnation wheels.

Attention is now directed to FIGS. 9 and 10 which illustrate additional details of the impregnation wheels 66. Each of the wheels 66 is journaled for rotation on a shaft 108 that is secured to the frame section 105a. The outer cylindrical face of each of the wheels 66 is provided with a peripheral groove 110 that is configured to substantially match the cross-sectional shape of the fiber strip 52. Seating of the strip 52 within the groove 110 maintains the fiber strip 52 in proper alignment on the wheels 66.

Multiple through-holes 104 extend transversely through each of the wheels 66 to allow the matrix fluid to readily flow through the wheels 66, and thereby facilitate mixing of the bath 85 of the matrix fluid. The outer side of each of the wheels 66 includes a plurality of circumferentially spaced, axially extending, paddle-like protrusions 106. The protrusions 106 aid in mixing the matrix fluid to maintain the bath 85 homogeneous as the wheels 66 rotate within the bath of matrix fluid. Constant mixing of the matrix fluid may also extend the processing time for a given batch of the matrix fluid remains usable. In some embodiments, depending upon the constituents of the bath 85, and the amount of settling of particulates within the tank 24, it may be necessary or desirable to provide an auxiliary means of stirring the bath 85, which may comprise a mixer (not shown) that is either manually or automatically operated. Depending upon the particular matrix being employed as a constituent in the bath 85, it may be necessary to either heat or chill the bath 85 in order to achieve a desired matrix fluid viscosity, while in other embodiments, the bath 85 may be maintained at room temperature.

Figure 11:
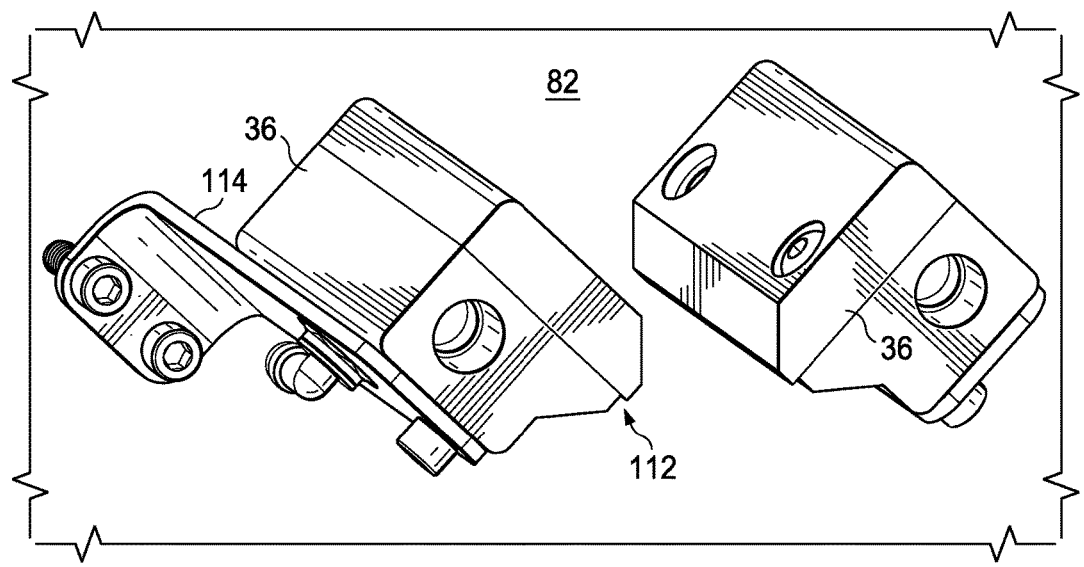
FIG. 11 is an illustration of a perspective view of the air knives.
Figure 12:
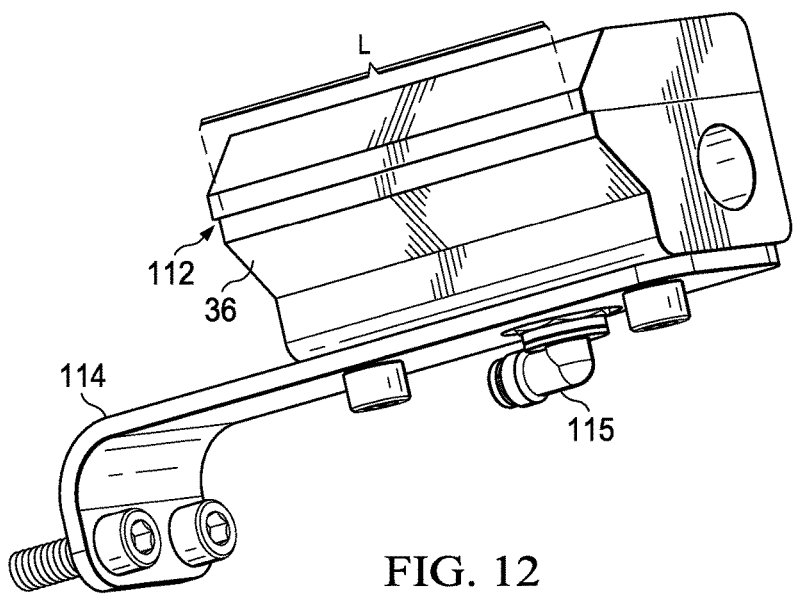
FIG. 12 is a perspective view of one of the air knives, better showing a slit-like air nozzle.
Figure 13:
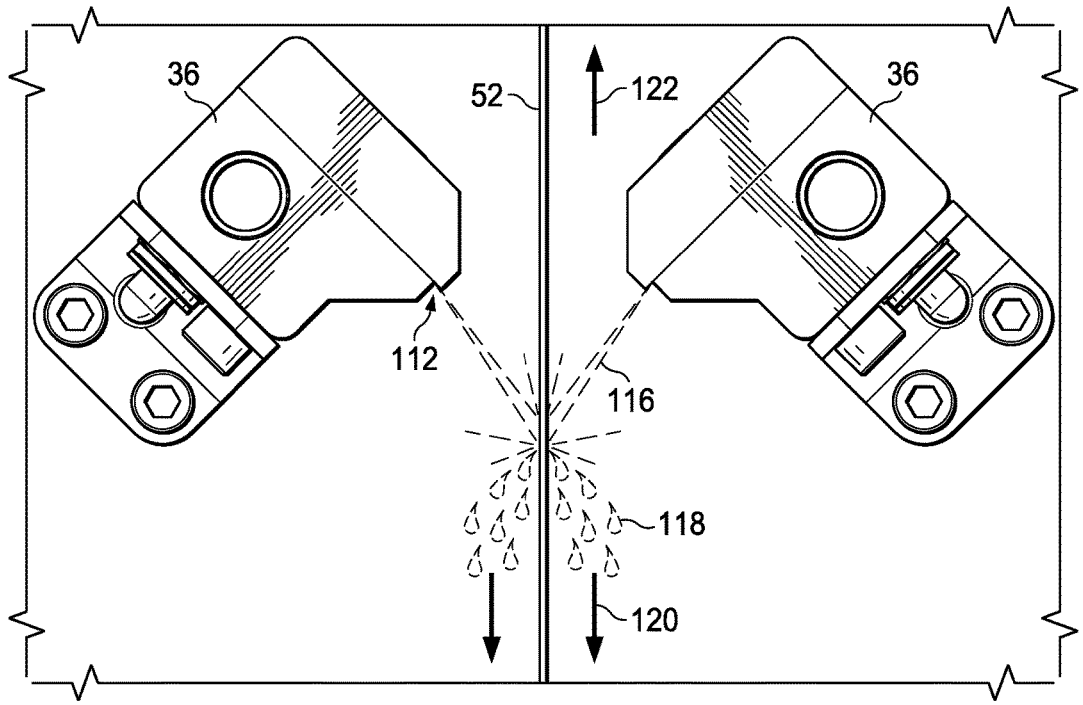
FIG. 13 is an illustration of a diagrammatic view showing the air knives stripping excess matrix fluid from an impregnated reinforcement strip.

FIGS. 11-13 illustrate additional details of the air knives 36 previously discussed. In one embodiment, each of the air knives 36 comprises a two-piece assembly having a slit-like nozzle opening 112 that is coupled with an inlet fitting 115 adapted to be coupled with the compressed air supply 38 (FIG. 1). Each of the air knives 36 is mounted on a bracket 114 secured to the mounting plate 82.

As best seen in FIG. 13, the air knives 36 respectively face opposite sides of the fiber strip 52, and are inclined such that the thin curtains 116 of laminar air flow are jetted from the nozzle openings 112 impinge upon the fiber strip 52 at angles that force the excess matrix fluid 118 downwardly 120. Gravity then draws the excess matrix fluid 118 into the tank 24. Other equivalent devices may be employed which use non-contact methods of wiping or stripping away excess matrix fluid 118 from the fiber strip 52. The laminar airflow produced by the air knives 36 provides non-contact removal of the excess matrix fluid, while also preventing the matrix fluid from splattering, and possible fluttering of the fiber strip 52. The angle of the air knives 36 as well as the volume of air flow and distance between the air knives 36 and the fiber strip will vary with the application, including the amount of excess matrix that needs to be removed from the fiber strip 52. In some embodiments, it may be necessary or desirable to employ more than one set of the air knives 36 to perform multiple stripping of the excess matrix fluid from the fiber strip 52.

Figure 14:
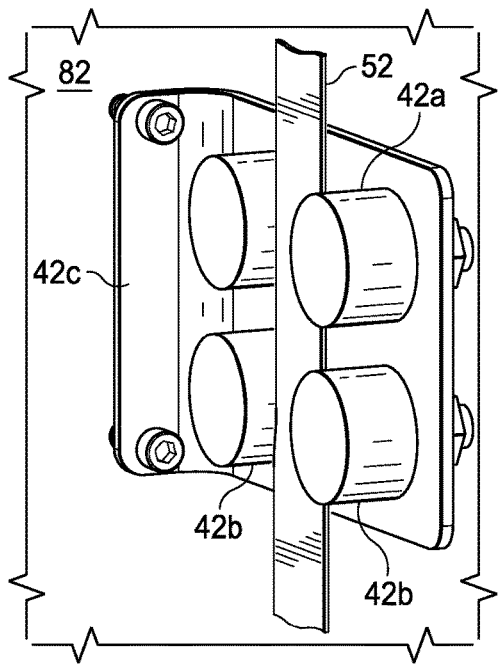
FIG. 14 is an illustration of a perspective view of the width control.
Figure 15:
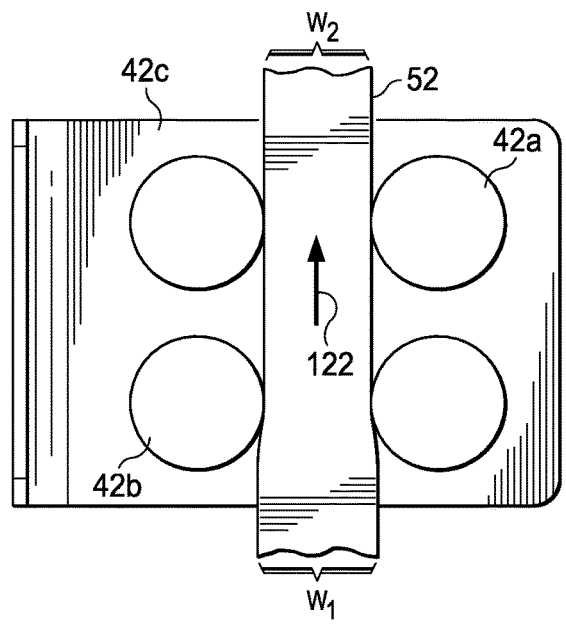
FIG. 15 is an illustration of a side elevational view of the width control, showing how an impregnated fiber strip is reduced to a desired width.

FIGS. 14 and 15 illustrate further details of the width control 42 previously discussed. Two pairs of vertically spaced-apart rollers 42a, 42b are supported on a mounting bracket 42c that is attached to the mounting plate 82. The spacing between the two rollers 42b is less than the width $W_1$ of the fiber strip as it enters the width control 42. In one embodiment, the nominal width of the fiber strip 52 may be approximately ½ inch, while in other embodiments, depending upon the application, the width of the fiber strip 52 may be more or less than ½ inch. In some embodiments, the spacing between the two rollers 42a may be less than the spacing between the rollers 42b, while in other embodiments the spacing between the two sets of rollers 42a, 42b may be substantially the same. As the fiber strip 52 passes through the width control 42, the two sets of rollers 42a, 42b progressively squeeze the outer edges of the fiber strip 52 toward each other, causing the width of the fiber strip 52 to be reduced from its initial width $W_1$ before entering the width control 42 to a final desired, nominal width $W_2$. Generally, the air knives 36 strip away most of the excess matrix fluid from the fiber strip 52, and the rollers 42a, 42b strip away additional small amounts of excess matrix fluid, as required, to achieve the desired nominal width $W_2$. Although not shown in the Figures, a device for measuring the final width of the fiber strip 52 may be employed to verify that the desired nominal width $W_2$ has been achieved after passing through the width control 42.

Figure 16:
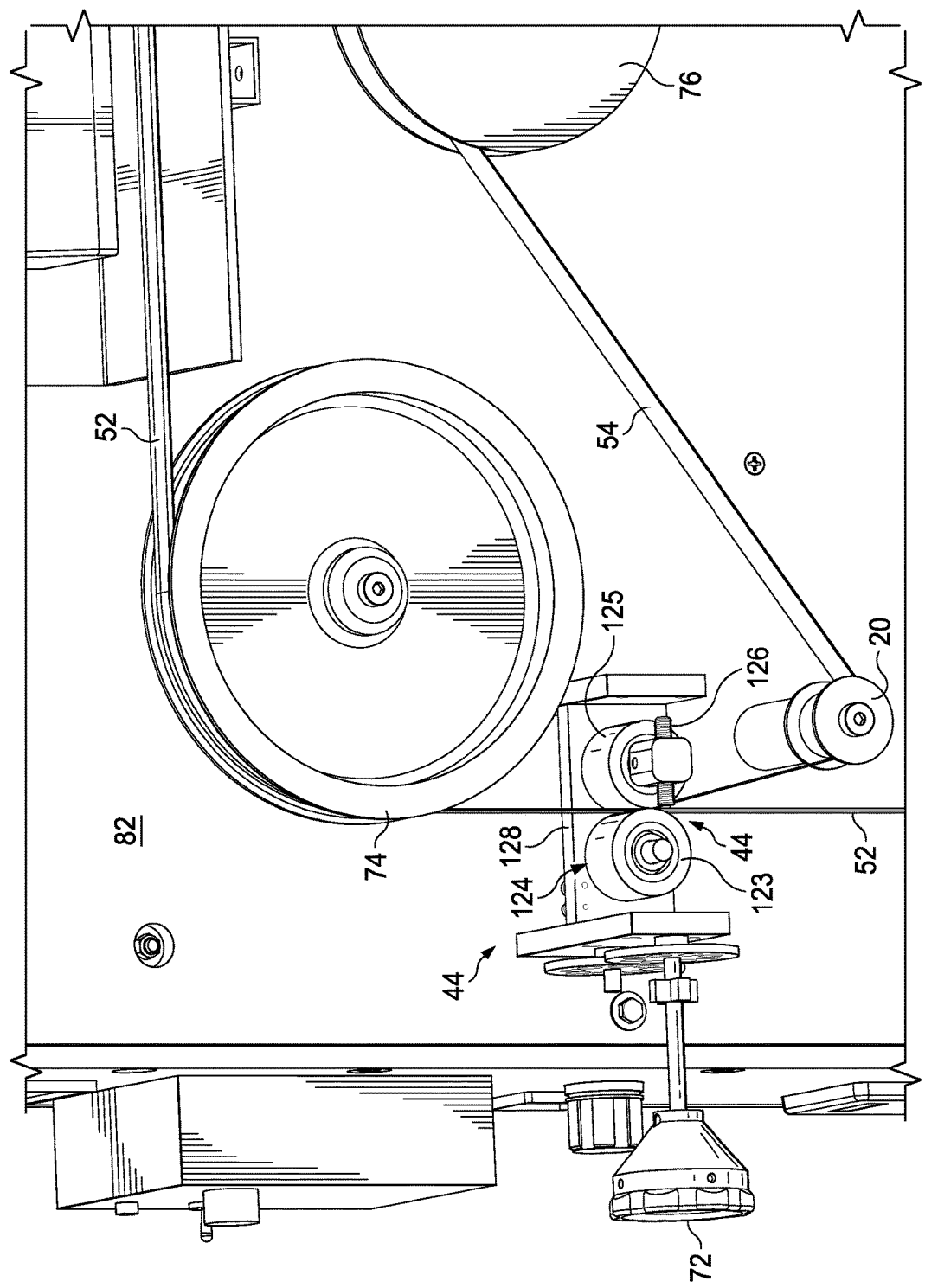
FIG. 16 is an illustration of a perspective view of the thickness control.

Attention is now directed to FIG. 16 which illustrates additional details of the thickness control previously discussed. The thickness control 44 includes a pair of rollers 123, 125 having cylindrical faces 124a that are parallel to each other and are spaced apart a distance corresponding to the desired nominal thickness to which the impregnated fiber strip 52 is to be reduced. Roller 123 is journaled for rotation on a support bracket 128 that is attached to the mounting plate 82. Roller 125 is mounted on the end of a lead screw 126 that is rotatable by an adjustment knob 72. Turning the knob 72 causes the lead screw 126 to move roller 125 either toward or away from roller 123, thereby adjusting the thickness to which the impregnated fiber strip 52 is reduced before traveling on to the redirect wheel 74. The thickness of the fiber strip 52 determines the amount of matrix fluid in the fiber strip 52. Thus, the rollers 123, 125 may squeeze out excess matrix fluid as the fiber strip 52 passes through the thickness control. The desired nominal thickness of the fiber strip 52 will depend upon the application, and the width of the fiber strip 52. For example, in applications where the fiber strip 52 is approximately ½ inch in width, the thickness of the fiber strip 52 may be approximately 5 mils, but in other applications may range between 2 mils and 50 mils. The fiber strip 52 thickness is primarily dependent on the speed at which the fiber strip 52 passes through the thickness control 44, and the spacing between the rollers 123, 125.

Figure 17:
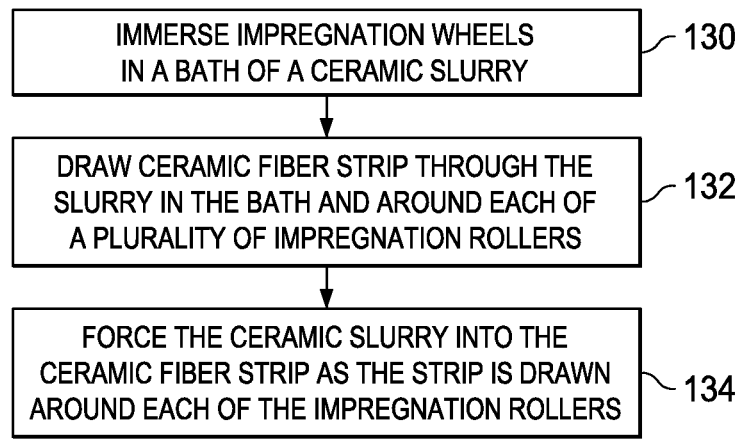
FIG. 17 is an illustration of a flow diagram of a method of impregnating a ceramic fiber strip with a ceramic matrix material.

FIG. 17 broadly illustrates the steps of a method of impregnating a ceramic fiber strip 52 with a ceramic matrix material. At 130, impregnation wheels 66 are immersed in the bath containing a ceramic slurry. At 132, a ceramic fiber strip is drawn through the slurry in the bath, and around each of a plurality of impregnation wheels 66. At 134, the ceramic slurry is forced into the ceramic fiber strip 52 as the strip 52 is drawn around each of the impregnation wheels 66.

Figure 18:
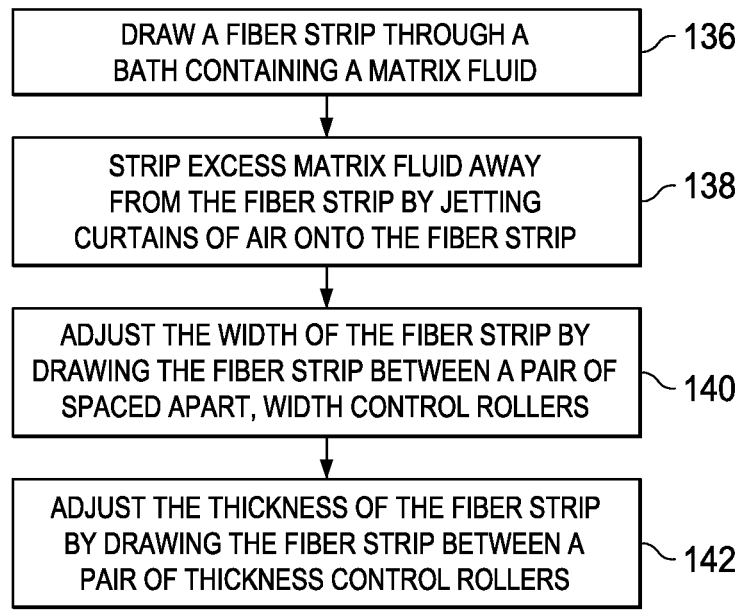
FIG. 18 is an illustration of a flow diagram of a method of impregnating a fiber strip with a matrix material.

FIG. 18 broadly illustrates the steps of a method of impregnating a fiber strip 52 with a matrix material. At 136, a fiber strip 52 is drawn through a bath containing a matrix fluid. At 138, excess matrix fluid 118 is stripped away from the fiber strip 52 by jetting curtains 116 of air onto the fiber strip 52. At 140, the width of the fiber strip 52 is adjusted by drawing the fiber strip 52 between a pair of spaced apart, width control rollers 42. At 142, the thickness of the fiber strip is adjusted by drawing the fiber strip 52 between a pair of thickness control rollers 123, 125.

Figure 19:
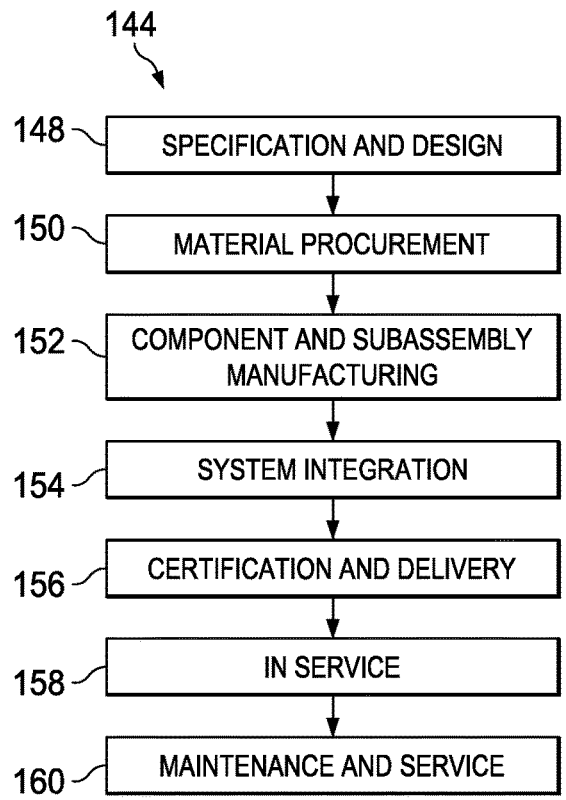
FIG. 19 is an illustration of a flow diagram of aircraft production and service methodology.
Figure 20:
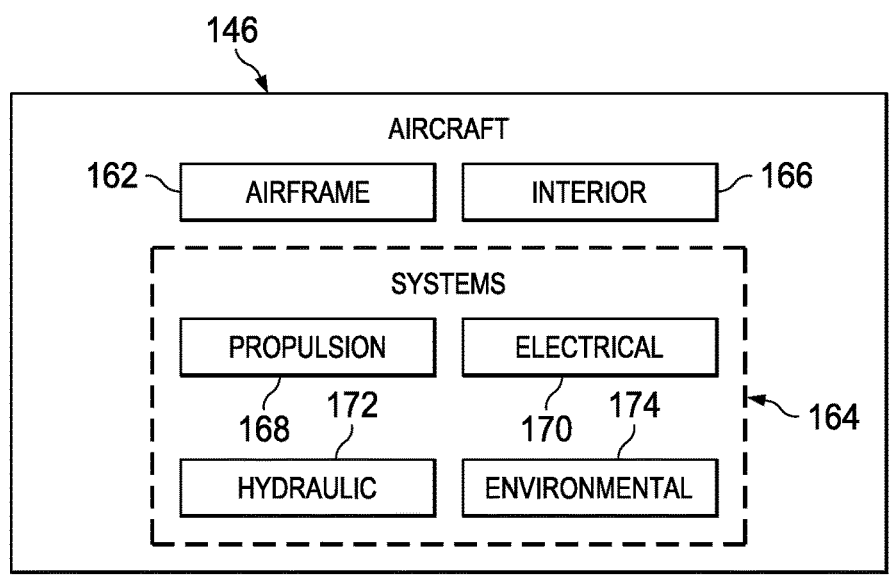
FIG. 20 is an illustration of a block diagram of an aircraft.

Embodiments of the disclosure may find use in a variety of potential applications, particularly in the transportation industry, including for example, aerospace, marine, automotive applications and other application where structural members formed of ceramic matrix composites may be used. Thus, referring now to FIGS. 19 and 20, embodiments of the disclosure may be used in the context of an aircraft manufacturing and service method 144 as shown in FIG. 19 and an aircraft 146 as shown in FIG. 20. Aircraft applications of the disclosed embodiments may include, for example, without limitation, a wide variety of structural members, particularly those used in high-temperature applications, that are formed from ceramic matrix composite build materials, especially structural members that are laid up using automated fiber placement equipment. During pre-production, exemplary method 144 may include specification and design 148 of the aircraft 146 and material procurement 150. During production, component and subassembly manufacturing 152 and system integration 154 of the aircraft 146 takes place. Thereafter, the aircraft 146 may go through certification and delivery 156 in order to be placed in service 158. While in service by a customer, the aircraft 146 is scheduled for routine maintenance and service 160, which may also include modification, reconfiguration, refurbishment, and so on.

Each of the processes of method 144 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 20, the aircraft 146 produced by exemplary method 144 may include an airframe 162 with a plurality of systems 164 and an interior 166. Examples of high-level systems 164 include one or more of a propulsion system 168, an electrical system 170, a hydraulic system 172 and an environmental system 174. Any number of other systems may be included. Although an aerospace example is shown, the principles of the disclosure may be applied to other industries, such as the marine and automotive industries.

Systems and methods embodied herein may be employed during any one or more of the stages of the production and service method 144. For example, components or subassemblies corresponding to production process 152 may be fabricated or manufactured in a manner similar to components or subassemblies produced while the aircraft 146 is in service. Also, one or more apparatus embodiments, method embodiments, or a combination thereof may be utilized during the production stages 152 and 154, for example, by substantially expediting assembly of or reducing the cost of an aircraft 146. Similarly, one or more of apparatus embodiments, method embodiments, or a combination thereof may be utilized while the aircraft 146 is in service, for example and without limitation, to maintenance and service 160.

As used herein, the phrase "at least one of", when used with a list of items, means different combinations of one or more of the listed items may be used and only one of each item in the list may be needed. For example, "at least one of item A, item B, and item C" may include, without limitation, item A, item A and item B, or item B. This example also may include item A, item B, and item C or item B and item C. The item may be a particular object, thing, or a category. In other words, at least one of means any combination items and number of items may be used from the list but not all of the items in the list are required.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different advantages as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. Apparatus for impregnating a continuous fiber strip with a matrix material, comprising:
a fiber strip supply reel configured to hold a length of the continuous fiber strip;
a matrix fluid bath configured to contain a matrix fluid;
a plurality of rotatable wheels immersed in the matrix fluid and arranged in a staggered pattern for guiding the continuous fiber strip in a serpentine path of travel through the matrix fluid bath, wherein the plurality of rotatable wheels forms the serpentine path of travel so that each face of the fiber strip contacts at least one of the plurality of rotatable wheels immersed in the matrix fluid bath, thereby forcing the matrix fluid into the continuous fiber strip to impregnate the continuous fiber strip with the matrix fluid;
at least one paddle protrusion axially-extending from at least certain ones of the wheels for mixing the matrix fluid as the wheel rotates; and
a take-up reel for taking up the continuous fiber strip after the continuous fiber strip has been impregnated with the matrix fluid.

2. The apparatus of claim 1, wherein each of the wheels includes through holes therein allowing the matrix fluid to pass therethrough.

3. The apparatus of claim 1, further comprising:
a pair of air knives for stripping away excess matrix fluid from the continuous fiber strip.

4. The apparatus of claim 3, wherein:
the air knives include nozzle openings respectively located on opposite sides of the continuous fiber strip; and
the nozzle openings are configured to jet curtains of pressurized, laminar air flow onto the continuous fiber strip.

5. The apparatus of claim 1, further comprising:
a width control for controlling the width of the continuous fiber strip after the continuous fiber strip has been impregnated with the matrix fluid;
a thickness control for controlling the thickness of the continuous fiber strip after the continuous fiber strip has been impregnated with the matrix fluid; and
a dryer for drying the continuous fiber strip after the continuous fiber strip has been impregnated with the matrix fluid.

6. The apparatus of claim 1, further comprising:
at least one reel adapted to contain a backer tape for adding a backer tape to the continuous fiber strip.

7. Apparatus for producing a ceramic prepreg strip, comprising:
a supply reel configured to hold a strip of dry ceramic fibers;
a ceramic slurry bath configured to contain a slurry of a ceramic matrix fluid;
a plurality of impregnation wheels arranged in a staggered pattern for guiding the strip of dry ceramic fibers through the ceramic slurry bath in a serpentine path of travel so that each face of the strip contacts at least one of the plurality of impregnation wheels immersed in the ceramic slurry bath, thereby forcing the ceramic matrix fluid into the strip of dry ceramic fibers to impregnate the strip of dry ceramic fibers with the ceramic matrix fluid;
at least one paddle protrusion axially-extending from at least certain ones of the impregnation wheels for mixing the matrix fluid as the impregnation wheels rotate;
a thickness control for controlling the thickness of the strip of dry ceramic fibers after the strip of dry ceramic fibers has been impregnated with the ceramic matrix fluid; and
a take-up reel for taking up the strip of dry ceramic fibers after the strip of dry ceramic fibers has been impregnated with the ceramic matrix fluid.

8. The apparatus of claim 7, further comprising:
a dryer including a heater for drying the ceramic matrix fluid in the fiber strip;
a temperature sensor for sensing a temperature related to a dryness of the fiber strip; and
a controller for adjusting the heater based on the temperature sensed by the temperature sensor.

9. The apparatus of claim 8, wherein:
the heater includes infrared lamps; and
the temperature sensor is located between the dryer and the take-up reel.

10. The apparatus of claim 7, further comprising:
at least one air knife for stripping away excess ceramic matrix on the fiber strip after the fiber strip has been impregnated; and
a width control for controlling the width of the fiber strip after the fiber strip has been impregnated.

11. The apparatus of claim 10, wherein the air knife and the width control are substantially vertically aligned with each other above the ceramic slurry bath.

12. The apparatus of claim 7, further comprising:
at least one pivoting swing arm; and
wherein the impregnation wheels are mounted on the at least one pivoting swing arm for pivoting movement between an operative position immersed within the ceramic slurry bath, and a standby position raised above the ceramic slurry bath.

13. Apparatus for impregnating a fiber strip with a matrix material, comprising:
a supply reel configured to hold a length of the fiber strip;
a matrix fluid bath configured to contain a matrix fluid;
at least one wheel within the matrix fluid bath for forcing the matrix fluid into the fiber strip;
at least one paddle protrusion axially-extending from the at least one of wheel for mixing the matrix fluid as the wheel rotates;
a device for stripping excess matrix fluid from the fiber strip; and
a take-up reel for taking up the fiber strip after the fiber strip has been stripped of excess matrix fluid.

14. The apparatus of claim 13, wherein the device for stripping the fiber strip includes air knives for jetting curtains of laminar air flow onto the fiber strip.

15. The apparatus of claim 14, wherein the device includes air nozzle openings located on opposite sides of the fiber strip.

16. A method of impregnating a continuous ceramic fiber strip with a ceramic matrix material, comprising:
immersing a plurality of impregnation wheels in a bath of a ceramic slurry;
drawing the continuous ceramic fiber strip through the bath in a serpentine path of travel and around each of the impregnation wheels so that each face of the fiber strip contacts at least one of the plurality of impregnation wheels immersed in the bath;

rotating the at least one impregnation wheel so that at least one paddle protrusion axially-extending from the at least one impregnation wheel mixes the matrix fluid; and forcing the ceramic slurry into the continuous ceramic fiber strip as the continuous ceramic fiber strip is drawn around each of the impregnation wheels.

17. The method of claim 16, wherein forcing the ceramic slurry into the continuous ceramic fiber strip is performed by tensioning the continuous ceramic fiber strip against each of the impregnation wheels.

18. The method of claim 16, further comprising:
stripping excess matrix fluid away from the continuous ceramic fiber strip after the continuous ceramic fiber strip is drawn through the bath, including jetting curtains of air onto the continuous ceramic fiber strip.

19. The method of claim 16, further comprising:
controlling a width of the continuous ceramic fiber strip by drawing the continuous ceramic fiber strip between a pair of rollers.

20. The method of claim 16, further comprising:
controlling a thickness of the continuous ceramic fiber strip by drawing the continuous ceramic fiber strip between a pair of spaced-apart rollers.

21. The apparatus of claim 1, further comprising:
at least one pivoting swing arm; and
wherein the impregnation wheels are mounted on the at least one pivoting swing arm for pivoting movement between an operative position immersed within the ceramic slurry bath, and a standby position raised above the ceramic slurry bath.

22. The apparatus of claim 1, further comprising:
a tensioning assembly for maintaining a desired amount of tension in the fiber strip.

23. The apparatus of claim 22, wherein the tensioning assembly further comprises:

a variable speed electric drive motor;
a clutch;
a spring-loaded pivotal swing arm having a take-up reel mounted thereto; and
a drag brake coupled with the fiber supply reel.

24. The apparatus of claim 5, wherein the width control further comprises:
a pair of vertically spaced-apart rollers for controlling the width of the continuous fiber strip after the continuous fiber strip has been impregnated with the matrix fluid by laterally squeezing outer edges of the continuous fiber strip.

25. The apparatus of claim 5, wherein the thickness control further comprises:
a pair of rollers for controlling the thickness of the continuous fiber strip and controlling the amount of matrix fluid in the continuous fiber strip by squeezing out excess fluid after the continuous fiber strip has been impregnated with the matrix fluid.

26. The apparatus of claim 5, wherein the dryer further comprises:
a heater for drying the ceramic matrix fluid in the fiber strip; and
a controller for adjusting the heater.

27. The apparatus of claim 26, wherein the dryer further comprises:
a temperature sensor for sensing a temperature related to a dryness of the fiber strip, wherein the controller adjusts the heater based on the temperature sensed by the temperature sensor.

28. The apparatus of claim 27, further comprising:
a take-up reel for taking up the strip of dry ceramic fibers after the strip of dry ceramic fibers has been impregnated with the ceramic matrix fluid, wherein the temperature sensor is located between the dryer and the take-up reel.

29. The apparatus of claim 6, further comprising:
at least one second reel adapted to contain a second backer tape for adding the second backer tape to a second side of the continuous fiber strip.

* * * * *